United States Patent
Tracy et al.

(10) Patent No.: US 8,432,676 B2
(45) Date of Patent: Apr. 30, 2013

(54) DISPLAY FOR NOTEBOOK COMPUTER AND METHOD OF MAKING A DISPLAY FOR A NOTEBOOK COMPUTER

(75) Inventors: Mark S. Tracy, Tomball, TX (US); Earl W. Moore, Cypress, TX (US); Steven S. Homer, Tomball, TX (US); Jeffrey A. Lev, Tomball, TX (US); Paul J. Doczy, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 132 days.

(21) Appl. No.: 13/120,740

(22) PCT Filed: Oct. 1, 2008

(86) PCT No.: PCT/US2008/078427
§ 371 (c)(1),
(2), (4) Date: Mar. 24, 2011

(87) PCT Pub. No.: WO2010/039132
PCT Pub. Date: Apr. 8, 2010

(65) Prior Publication Data
US 2011/0176269 A1 Jul. 21, 2011

(51) Int. Cl.
*G06F 1/16* (2006.01)

(52) U.S. Cl.
USPC ............ 361/679.26; 361/679.02; 361/679.27; 29/592

(58) Field of Classification Search . 361/679.26–679.28
See application file for complete search history.

(56) References Cited

U.S. PATENT DOCUMENTS

| | | | | |
|---|---|---|---|---|
| 4,111,328 | A | * | 9/1978 | Eggert et al. ................. 220/4.01 |
| 4,656,559 | A | * | 4/1987 | Fathi ............................. 361/721 |
| 6,155,093 | A | * | 12/2000 | Lipari ............................. 72/341 |
| D454,565 | S | * | 3/2002 | Harriman ..................... D14/374 |
| 7,042,724 | B2 | * | 5/2006 | Locker ......................... 361/699 |
| 7,046,507 | B2 | * | 5/2006 | Nakamura et al. ........ 361/679.27 |
| 7,515,431 | B1 | * | 4/2009 | Zadesky et al. .............. 361/752 |
| 2006/0104019 | A1 | | 5/2006 | Lin |
| 2006/0256514 | A1 | | 11/2006 | Wang |
| 2007/0058336 | A1 | * | 3/2007 | Cheng ........................ 361/687 |
| 2008/0055828 | A1 | * | 3/2008 | Yang ........................... 361/680 |
| 2009/0040703 | A1 | * | 2/2009 | Gotham et al. .............. 361/681 |
| 2010/0053911 | A1 | * | 3/2010 | Weiss et al. ................. 361/752 |
| 2010/0055389 | A1 | * | 3/2010 | Allore et al. ................. 428/119 |
| 2010/0061039 | A1 | * | 3/2010 | Sanford et al. .......... 361/679.01 |

FOREIGN PATENT DOCUMENTS

KR 20000024979 5/2000

OTHER PUBLICATIONS

International Searching Authority, International Search Report and Written Opinion, Appln No. PCT/US2008/078427, date of mailing Jun. 23, 2009, pp. 12.

* cited by examiner

Primary Examiner — Anthony Q Edwards

(57) ABSTRACT

A display for a notebook computer can include a display panel and a frame configured to house the display panel. The frame can have a one-piece construction from a rear surface of the frame to a front surface of the frame. A method of making a display for a notebook computer is also provided. The method can include the steps of providing a frame and inserting a display panel into the frame. The frame can have a one-piece construction from a rear surface of the frame to a front surface of the frame.

19 Claims, 6 Drawing Sheets

DISPLAY FOR NOTEBOOK COMPUTER AND METHOD OF MAKING A DISPLAY FOR A NOTEBOOK COMPUTER

BACKGROUND

The present disclosure relates generally to a display for a notebook computer and a method of making a display for a notebook computer.

A conventional display for a notebook computer includes a frame that is made of several parts. For example, a conventional frame can be made from a rear panel and a front bezel. A rear portion of a display panel is fastened to the rear panel and a front bezel is fitted over a front portion of the display panel and fastened to the rear panel to form a display. Such components of a display frame have been made from molded plastic, die cast magnesium, or cold formed aluminum.

However, such conventional displays can be relatively low in strength and stiffness. Due to the relatively low strength and stiffness of the frame, such conventional displays are a recurring site for failures of notebook computers. For example, a conventional display may fail or break when sufficient force is applied to the display, such as a rear surface of the display when the display of a notebook computer is in a closed position.

Furthermore, because the frame of such conventional displays are made of several components, several manufacturing steps are required to construct the displays, such as providing the rear panel of the frame, fastening the display panel to the rear panel of the frame, fitting a front bezel of the frame over the display panel, and fastening the front bezel to the rear panel.

SUMMARY

One embodiment of the invention relates to a display for a notebook computer. The display can include a display panel and a frame configured to house the display panel. The frame can have a one-piece construction from a rear surface of the frame to a front surface of the frame.

Another embodiment of the invention relates to a method of making a display for a notebook computer. The method can include the steps of providing a frame and inserting a display panel into the frame. The frame can have a one-piece construction from a rear surface of the frame to a front surface of the frame.

BRIEF DESCRIPTION OF THE DRAWINGS

These and other features, aspects, and advantages of the present disclosure will become apparent from the following description, appended claims, and the accompanying exemplary embodiments shown in the drawings, which are briefly described below.

DETAILED DESCRIPTION

Figure 1:
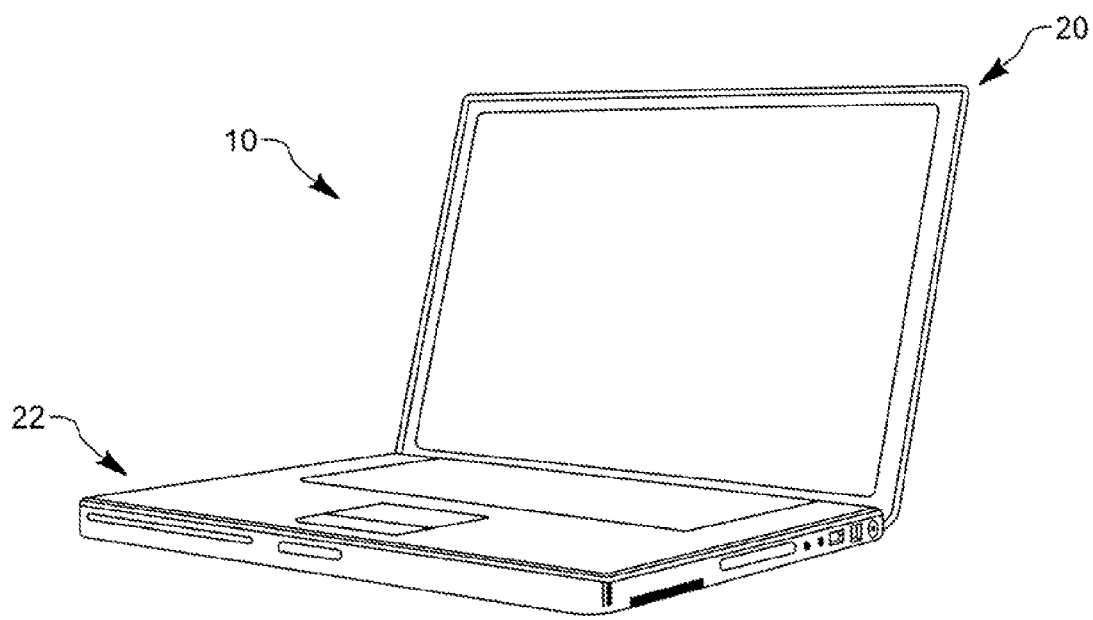
FIG. 1 is an isometric view of a notebook computer, according to an embodiment.

Presently preferred embodiments of the invention are illustrated in the drawings. In the drawings, an effort has been made to use like numerals to represent like parts.

Referring to FIG. 1, an example of a notebook computer 10 is shown, according to an embodiment. The notebook computer 10 includes a base 22 and a display 20. The display 20 and the base 22 are connected so that the display 20 and the base 22 can be pivoted relative to one another about at least one hinge (not shown) joining the display 20 and the base 22 together.

Figure 2:
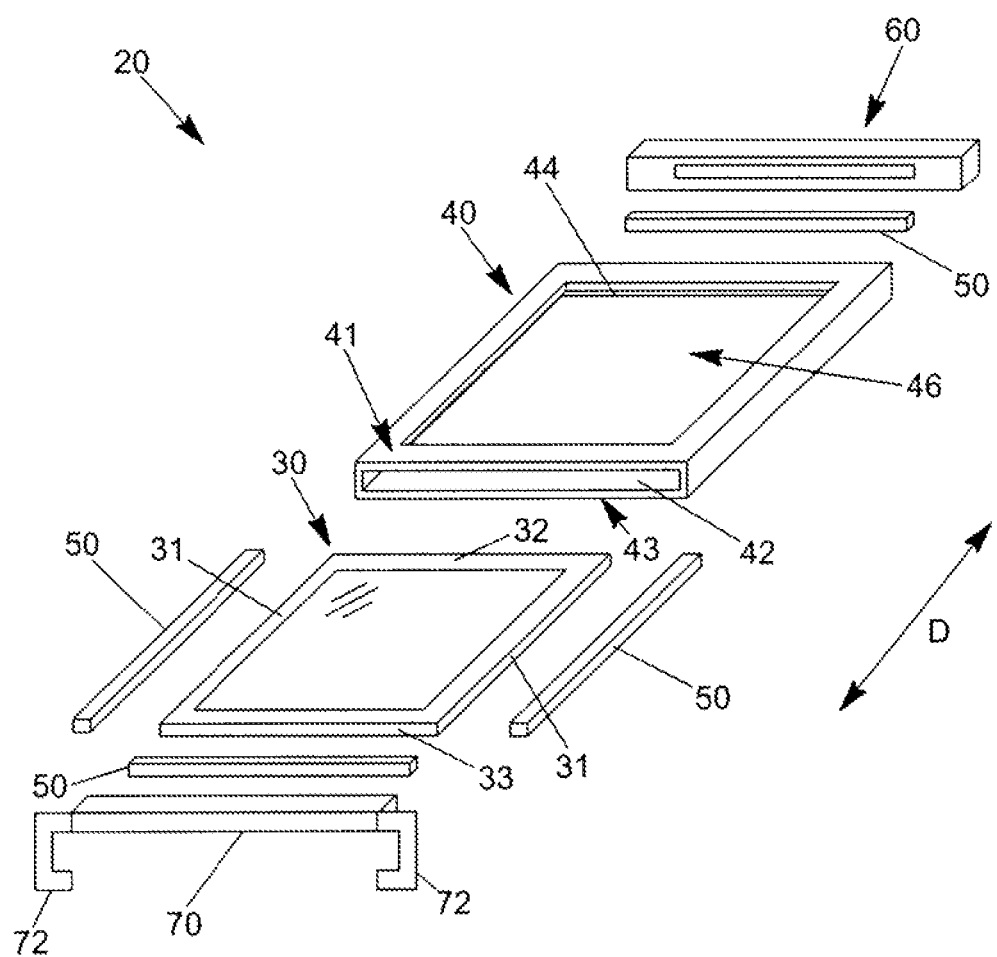
FIG. 2 is an exploded view of a display for a notebook computer, according to an embodiment.

FIG. 2 is an exploded view of a display 20, according to an embodiment. As shown in the example of FIG. 2, a display 20 can include a display panel 30 and a frame 40. The display panel 30 can be, for example, a liquid crystal display panel or other type of display panel used in the art. The frame 40 can form an enclosure for display panel 30, such that the frame 40 houses the display panel 30.

The frame 40 can have a one-piece construction. Such a one-piece construction can provide an improved amount of strength and stiffness for the frame 40 and the display 20 that the frame 40 is used in. The one-piece construction can provide the display 20 with an improved durability, thus providing the display 20 with an improved resistance to damage and failure while maintaining a low weight for the display 20. Furthermore, the one-piece construction of the frame 40 can make the display 20 simpler to manufacture, can cause the display 20 to be made in fewer steps, and can cause the display 20 to be easier to service. For example, as shown in FIG. 2, the frame 40 can have a one-piece construction from a rear surface 43 of the frame 40 to a front surface 41 of the frame 40.

As shown in the example of FIG. 2, the frame 40 can be formed to be a rectangular box. Furthermore, the frame 40 can have at least one opening at an end of the frame, such as an opening to insert a display panel 30 into the frame 40. For example, the frame 40 can include at opening 42 at a bottom end of the frame 40 and an opening 44 (partially shown in FIG. 2) at the top end of the frame 40.

The frame 40 can be made of metal. By making the frame 40 out of metal, the frame 40 can be imparted with a classic metal industrial design look. Furthermore, the metal of the frame 40 can be processed to show the grain pattern of the metal.

The frame 40 can be an extruded frame. For example, the frame 40 can be made of metal that has been extruded in the direction indicated by arrow D in FIG. 2. Due to the extrusion process to make such an extruded frame, the frame 40 would have a metallic grain structure that is deformed and elongated in the direction D of extrusion. An extrusion process can be used as a low-cost manufacturing process to make the frame 40. For example, a long, hollow, single workpiece can be extruded and then cut to length to form the basic shape of the frame 40. Furthermore, such an extrusion process can implement extrusion tooling, which can be relatively lower in cost than the tooling used for other processes, such as, for example, die casting tooling.

As shown in the example of FIG. 2, the frame 40 can include an opening 46, such as an opening 46 that is arranged to provide a view of a display panel 30 within the frame 40. The frame 40 can be processed to form the opening 46. For example, the opening 46 can be formed in the frame 40 by, for example, stamping or machining the frame 40. In another example, the opening 46 can be formed by computer numerical control (CNC) machining.

The frame 40 can be made of aluminum or an aluminum alloy. The use of aluminum or an aluminum alloy provides the frame 40 with a relatively high strength while providing the frame 40 with a low weight. In another example, the frame 40 can be made of a 6000 series aluminum alloy. In another example, the frame 40 can be made of 6061 aluminum alloy, such as, for example, 6061 aluminum alloy in a T6 heat treated condition.

The display 20 can include at least one shock absorbing mount 50. Such a shock absorbing mount 50 can be joined or connected to the display panel 30 so that the shock absorbing mount 50 absorbs at least a portion of shocks, forces, or stresses that are applied to the display 20. Thus, a shock absorbing mount can provide additional protection for a display panel 30 that is housed within the frame 40 of the display 20.

As shown in the example of FIG. 2, the display 20 can include a shock absorbing mount 50 that is joined or connected to the lateral sides 31 of a display panel 30 and/or the top 32 and bottom 33 ends of the display panel 30. Such shock absorbing mounts 50 can be joined or connected to the sides and/or ends of the display panel 30 as means for joining the display panel 30 to the frame 40, as will be discussed herein. A shock absorbing mount 50 can be made of material that beneficially absorbs shocks, forces, or stresses transferred to the shock absorbing mount 50. For example, the shock absorbing mount 50 can be made of an elastomeric material, such as, for example, rubber. A shock absorbing mount 50 can be joined to a display panel 30 via bonding, fastening, or other ways used in the art.

The display 20 can include a top cover 60, as shown in the example of FIG. 2. The top cover 60 can be made of plastic, a non-metallic material, or other materials used in the art, such as, for example, when the top cover 60 includes an antenna and the top cover 60 must be made of a material that will not interfere with transmissions from the antenna. Such an antenna can be, for example, a wireless antenna. The plastic can be, for example, a high strength plastic. Examples of high strength plastics include polycarbonate, glass or carbon fiber filled polycarbonate, polyester, and PPS. These examples can respectively be Lexan, Verton, Valox, and Noryl, as produced by SABIC. Other examples include polyamide, such as DuPont's super tough nylon Zytel, and carbon fiber composites.

As shown in the example of FIG. 2, the display 20 can include a base assembly 70. Such a base assembly 70 can be configured to join the display 20 to a base 22 of a notebook computer 10. The base assembly 70 can, for example, include at least one hinge or at least one hinge portion 72 that joins the display 20 to the base 22. Furthermore, such a hinge or hinge portion 72 can include a clutch mechanism that is configured to maintain a viewing angle between the display 20 and the base 22. The base assembly can be made of, for example, plastic, magnesium, or other materials used in the art.

Figure 3:
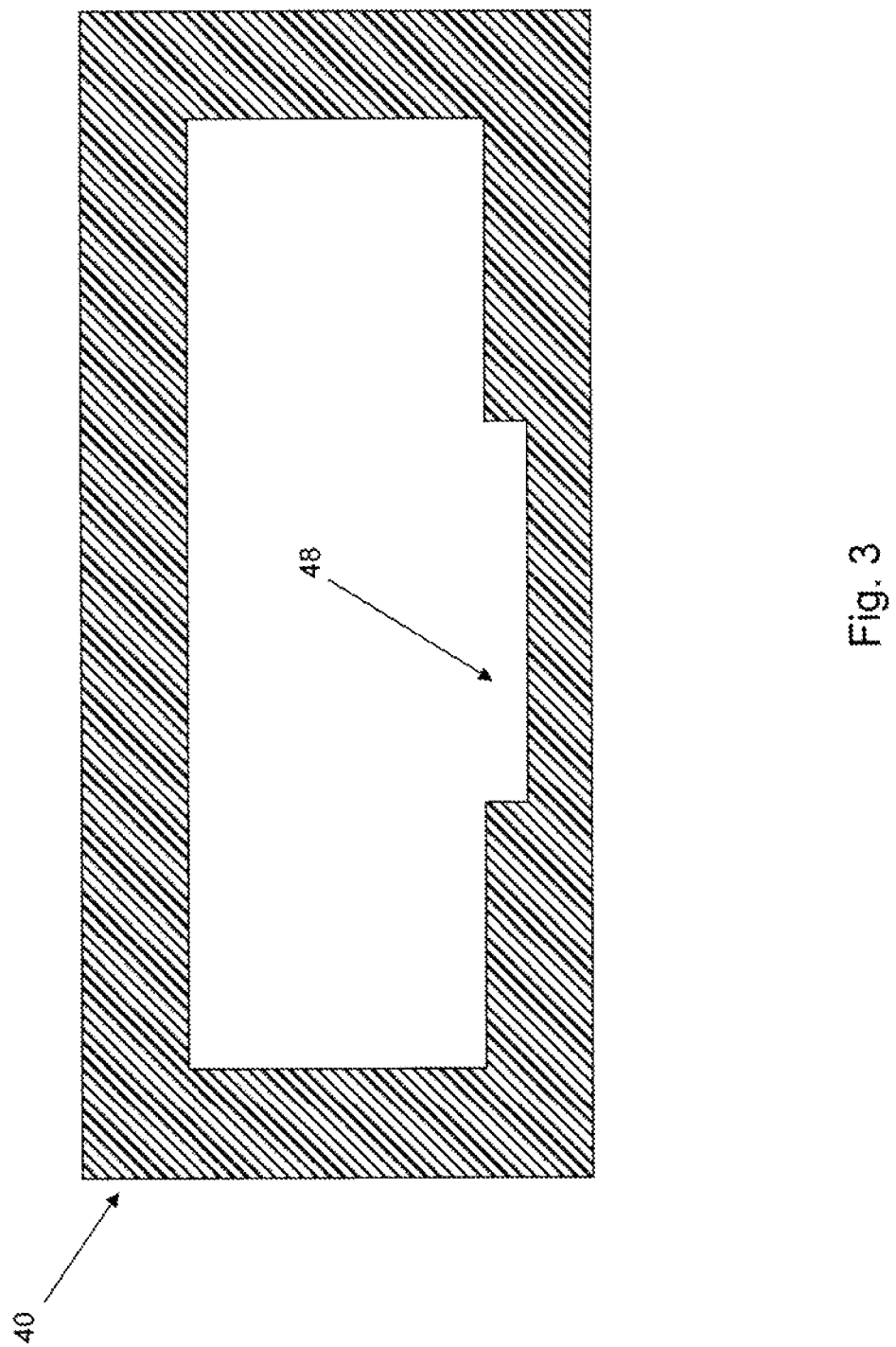
FIG. 3 is a sectional view of a frame for a display, according to an embodiment.

The frame 40, for example, can be formed so that the frame 40 includes features integrated within the frame 40 itself, such as, for example, a surface of the frame 40. FIG. 3 is a sectional view of an exemplary frame 40 that includes a guide 48 formed within a surface of the frame 40. Such a guide 48 can be formed, for example, by extrusion by configuring an extrusion die to form the guide 48 in a surface of the frame 40 in a direction of a long axis of the extruded frame 40. The guide 48 can be configured, for example, to house at least one cable, such as, for example, a cable for a wireless device.

Figure 4A:
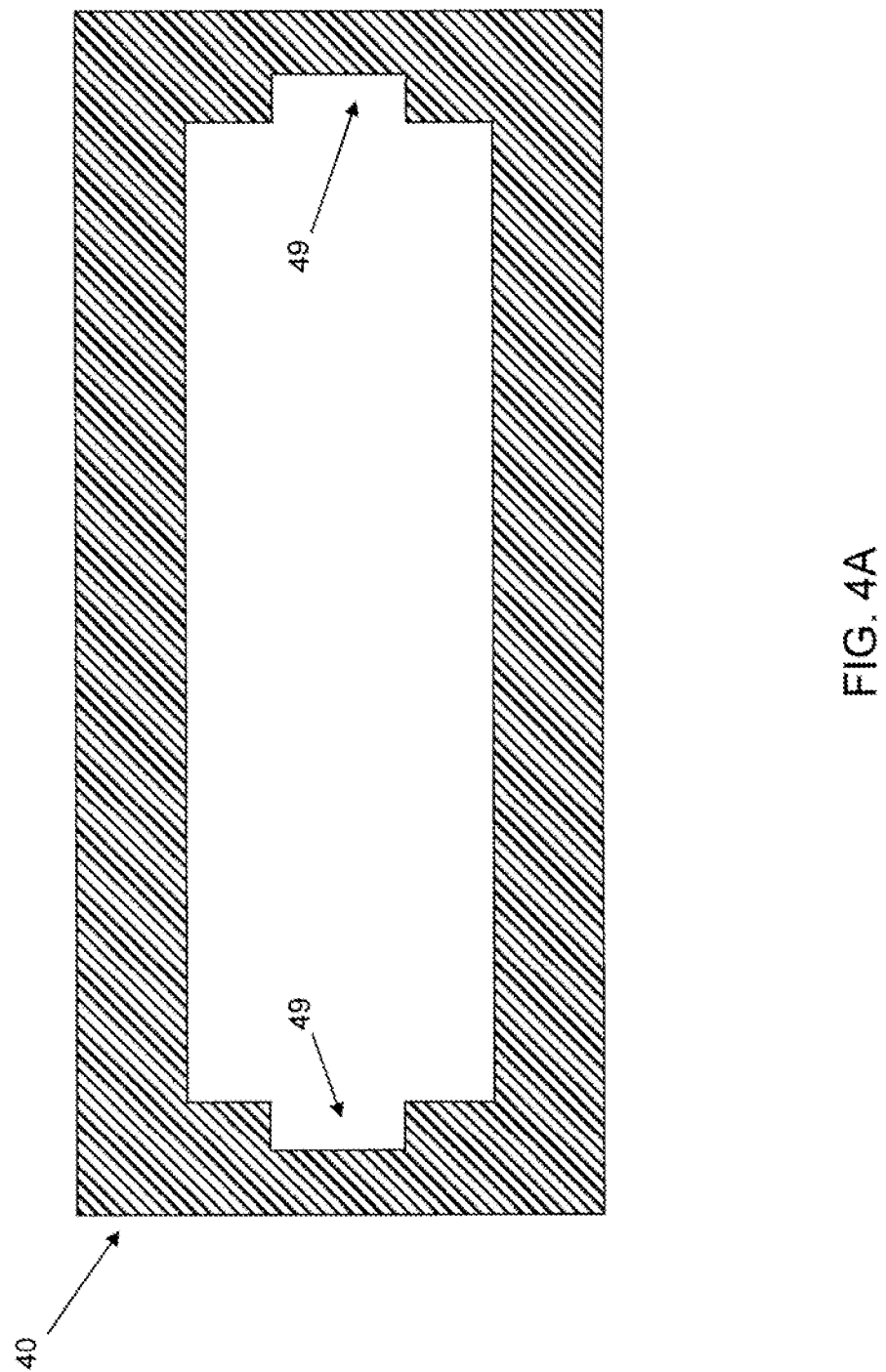
FIG. 4A is a sectional view of a frame for a display, according to an embodiment.

The frame 40, for example, can be formed to include a guide for a display panel 30 so that the display panel 30 can be positioned and held within the frame 40. FIG. 4A is a sectional view of an exemplary frame 40 that includes guides 49 formed within lateral side surfaces of the frame 40. Such guides 49 can be configured to position and hold a display panel 30 within the frame 40. Such guides 49 can be formed by the same methods discussed for the guide 48 above. The frame 40 can also include a guide 48 as discussed in the examples above.

Figure 4B:
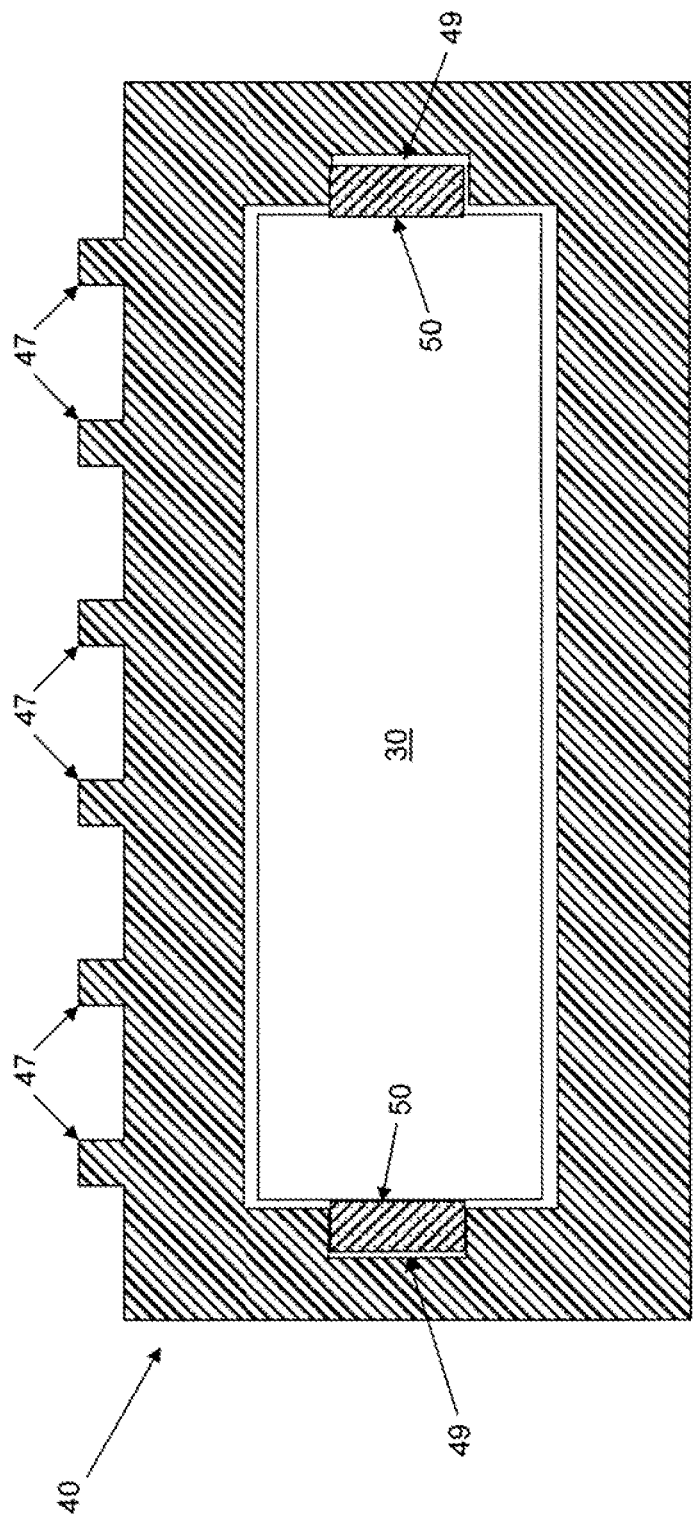
FIG. 4B is a sectional view of a frame for a display with a display panel installed within the frame, according to an embodiment.

As shown in the example of FIG. 4B, the frame 40 can include protrusions 47 in at least one surface of the frame 40. The protrusions 47 can serve as ribs or fins to radiate heat from the frame and/or as grips to aid the handling and installation of the frame. The protrusions 47 can be formed on one side or surface of the frame 40, as shown in the example of FIG. 4B, or the protrusions 47 can be formed on multiple sides or surfaces of the frame, as is needed for heat transfer and/or gripping purposes.

In another example, the guide 49 can formed to accommodate a shock absorbing mount 50. For example, the guide 49 can accommodate a shock absorbing mount 50 that is joined or connected to a display panel 30. As shown in the example of FIG. 4B, a guide 49 can connect a display panel 30 to the frame 40 by positioning a shock absorbing mount 50 that is joined or connected to a display panel 30 within the guide 49 which is formed in a surface of the frame 40. Thus, the guide 49 can position and hold a display panel 30 within the frame 40 by positioning a shock absorbing mount 50 within the guide 49.

In another example, a shock absorbing mount 50 can be held within at least one guide 49 of the frame 40 without the shock absorbing mount 50 being bonded or fastened to the frame 40. For example, a display panel 30 with at least one shock absorbing mount 50 can be inserted into a frame 40 by sliding the display panel 30 into an opening of the frame, such as through opening 42 in the direction indicated by arrow D in the example of FIG. 2, or through opening 44 in a direction opposite to the direction indicated by arrow D, so that the shock absorbing mount 50 is inserted into, and slides along, a guide 49 formed in a surface of the frame 40. Therefore, the shock absorbing mount 50 can be held within the guide 49 without bonding or fastening the shock absorbing mount 50 to the frame 40.

By not bonding or fastening a shock absorbing mount 50 to a frame 40, the shock absorbing mount 50 can advantageously maintain the resiliency and shock absorbing properties of the shock absorbing mount 50. For example, by not using any bonding materials or fasteners the shock absorbing mount 50 does not implement any materials, such as a rigid fastener, which can reduce the resiliency and shock absorbing properties of such a shock absorbing mount 50. For example, the use of a stiff fastener to join a shock absorbing mount 50 to the frame 40 could cause the fastener to transmit shock, forces, or stress from the frame 40 to a display panel 30, thus minimizing the beneficial absorbing effects of the shock absorbing mount 50. Furthermore, the lack of bonding or fastening the shock absorbing mount 50 to the frame 40 means that a display 20 can be manufactured in fewer steps and can be manufactured with less material cost. Furthermore, such a display 20 can be made with improved tolerances, such as smaller tolerances, thus providing a product of improved quality.

Figure 4C:
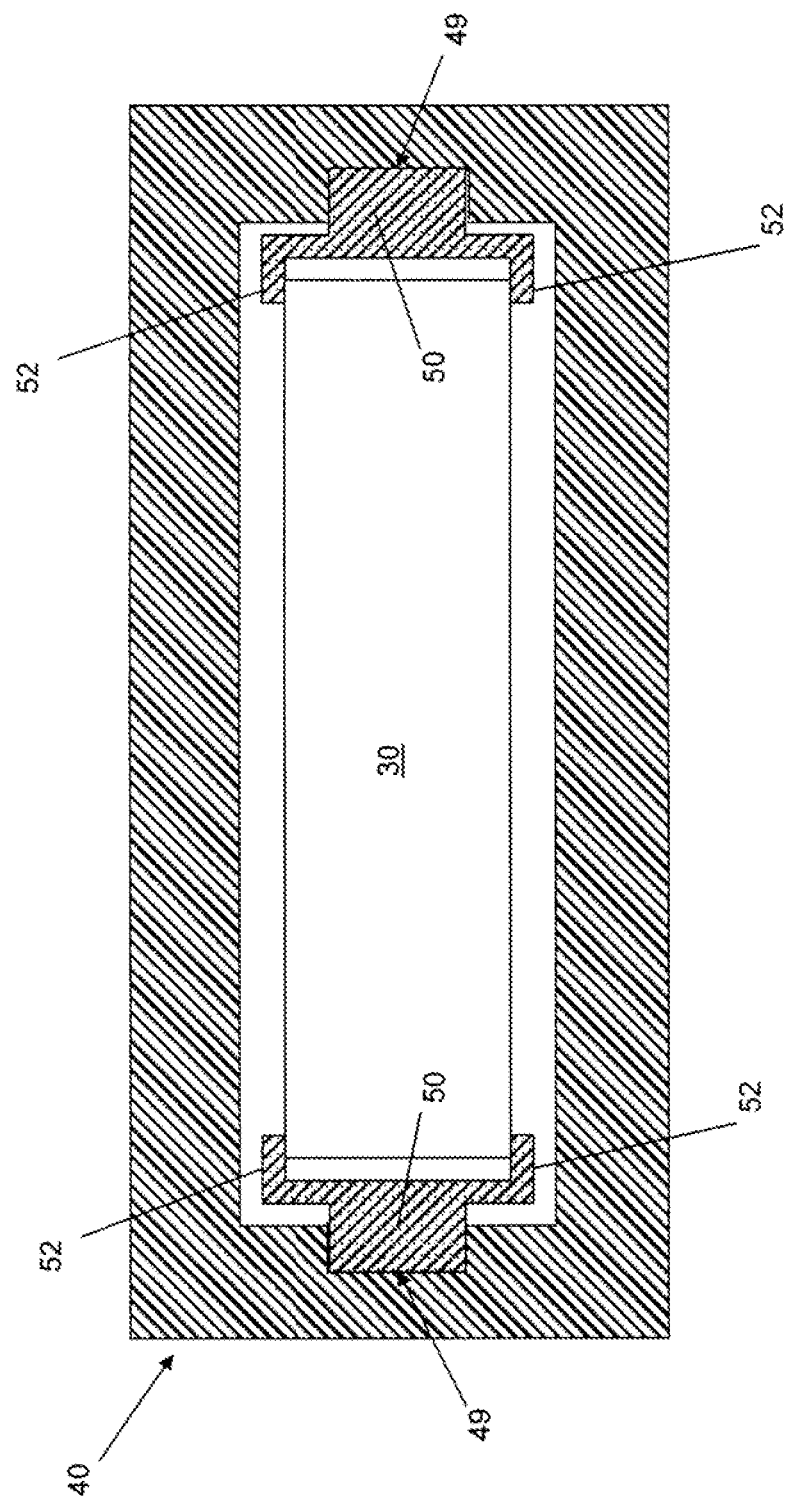
FIG. 4C is a sectional view of a frame for a display with a display panel installed within the frame, according to an embodiment.

FIG. 4C is a sectional view of a frame 40 that includes a display panel 30 held by another example of a shock absorbing mount 50. As shown in the example of FIG. 4C, a shock absorbing mount 50 can include lateral flanges 52 that can act to minimize forces transmitted to the display panel 30. The lateral flanges 52 can be configured to grip and/or hold the display panel 30 in place within the frame 40, as shown in the example of FIG. 4C.

According to an embodiment, a method of making a display 20 for a notebook computer 10 is provided. The method can, for example, include the steps of providing a frame 40 and inserting a display panel 30 into the frame 40. The display 20, including the frame 40 and display panel 30, can be configured and formed according to the embodiments and examples described herein. For example, the display panel 30 can be inserted into the frame 40 by inserting the display panel 30 into an opening of the frame 40, such as through opening 42 in the direction indicated by arrow D in the example of FIG. 2, or through opening 44 in a direction opposite to the direction indicated by arrow D.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other embodiments of the invention will be apparent to those skilled in the art from consideration of the specification and practice of the invention disclosed herein.

What is claimed is:

1. A display for a notebook computer, comprising:
   a display panel;
   a frame configured to house the display panel, wherein the frame has a one-piece construction from a rear surface of the frame to a front surface of the frame; and
   at least one shock absorbing mount that is connected to the display panel.

2. The display of claim 1, wherein the frame is an extruded frame.

3. The display of claim 1, wherein the frame is made of an aluminum alloy.

4. The display of claim 1, wherein the frame includes at least one guide formed in a surface of the frame.

5. The display of claim 4, wherein the at least one guide is an extruded guide formed in the surface of the frame.

6. The display of claim 5, wherein the at least one guide is configured to house at least one cable.

7. The display of claim 4, wherein the at least one guide is configured to position the display panel within the frame.

8. The display of claim 1, wherein the at least one shock absorbing mount connects the display panel to the frame by positioning the at least one shock absorbing mount within at least one guide formed in a surface of the frame.

9. The display of claim 8, wherein the at least one shock absorbing mount is held within the at least one guide of the frame without the at least one shock absorbing mount being bonded or fastened to the frame.

10. The display of claim 1, wherein the one-piece construction of the frame has opposite openings on opposite ends of an axis and wherein the one-piece construction of the frame further comprises extruded protrusions on an exterior of the frame and extending in directions parallel to the axis.

11. The display of claim 1, wherein the one-piece construction of the frame has opposite openings on opposite ends of an axis and wherein the one-piece construction of the frame further comprises an extruded channel on an interior of the frame and extending in a direction parallel to the axis, the channel being configured to house at least one cable.

12. The display of claim 1, wherein the at least one shock absorbing mount comprises a main portion extending along the edge of the display panel and lateral flanges extending from the main portion on opposite faces of the display panel.

13. The display of claim 1, wherein the at least one shock absorbing mount comprises:
   a first shock absorbing mount received within a first extruded channel on a first side of the display panel between the frame and the first side of the display panel; and
   a second shock absorbing mount received within a second extruded channel on a second side of the display panel between the frame and the second side of the display panel.

14. The display of claim 13, wherein the at least one shock absorbing mount comprises:
   a third shock absorbing mount on a third side of the display panel; and
   a fourth shock absorbing mount on a fourth side of the display panel.

15. The display of claim 1, wherein the one-piece construction of the frame has opposite openings on opposite ends of an axis and wherein the display further comprises a cover covering one of the opposite openings.

16. A method of making a display for a notebook computer, comprising:
   providing a frame, wherein the frame has a one-piece construction from a rear surface of the frame to a front surface of the frame, and
   inserting a display panel into the frame, wherein the step of inserting the display panel into the frame comprises connecting the display panel to the frame by positioning at least one shock absorbing mount within at least one guide that is formed in a surface of the frame.

17. The method of claim 16, wherein the frame is formed by extrusion.

18. The method of claim 16, wherein at least one guide is formed by extruding the at least one guide in a surface of the frame.

19. The method of claim 16, wherein the at least one shock absorbing mount is held within the at least one guide of the frame without the at least one shock absorbing mount being bonded or fastened to the frame.

* * * * *